United States Patent
Kapoor et al.

(10) Patent No.: US 12,141,071 B2
(45) Date of Patent: Nov. 12, 2024

(54) PERFORMANCE AND RELIABILITY OF PROCESSOR STORE OPERATION DATA TRANSFERS

(71) Applicant: International Business Machines Corporation, Armonk, NY (US)

(72) Inventors: Shakti Kapoor, Austin, TX (US); Nelson Wu, Austin, TX (US); Manoj Dusanapudi, Bangalore (IN)

(73) Assignee: International Business Machnes Corporation, Armonk, NY (US)

( * ) Notice: Subject to any disclaimer, the term of this patent is extended or adjusted under 35 U.S.C. 154(b) by 42 days.

(21) Appl. No.: 17/869,956

(22) Filed: Jul. 21, 2022

(65) Prior Publication Data

US 2024/0028518 A1 Jan. 25, 2024

(51) Int. Cl.
*G06F 12/08* (2016.01)
*G06F 12/0875* (2016.01)

(52) U.S. Cl.
CPC ...... *G06F 12/0875* (2013.01); *G06F 2212/60* (2013.01)

(58) Field of Classification Search
CPC ............ G06F 12/0875; G06F 2212/60; G06F 12/0877; G06F 9/3834; G06F 12/0897
See application file for complete search history.

(56) References Cited

U.S. PATENT DOCUMENTS

| 8,799,914 | B1 | 8/2014 | Metcalf |
| 8,934,347 | B1 | 1/2015 | Bratt et al. |
| 9,507,745 | B1 | 11/2016 | Bratt et al. |
| 10,067,796 | B1 | 9/2018 | Metcalf |
| 10,095,526 | B2 | 10/2018 | Duncan et al. |
| 10,210,092 | B1 | 2/2019 | Miao et al. |
| 11,099,990 | B2 | 8/2021 | Levinsky et al. |
| 2008/0086622 | A1 | 4/2008 | Chang |
| 2008/0307127 | A1 | 12/2008 | Alankry et al. |

(Continued)

FOREIGN PATENT DOCUMENTS

| CN | 110908929 B | 6/2023 |
| TW | 1624791 B | 5/2018 |

OTHER PUBLICATIONS

International Search Report and Written Opinion of PCT Application No. PCT/EP2023/069053, issued on Oct. 16, 2023, 11 pages.

(Continued)

*Primary Examiner* — Rocia Del Mar Perez-Velez
*Assistant Examiner* — Julian S Mendel
(74) *Attorney, Agent, or Firm* — CHIP LAW GROUP (57) ABSTRACT

Provided is a processor that includes a load and store unit (LSU) and a cache memory, and transfers data information from a store queue in the LSU to the cache memory. The cache memory requests an information packet from the LSU when the cache memory determines that an available entry exists in a store queue within the cache memory. The LSU acknowledges the request and transfers an information packet to the cache memory. The LSU anticipates that an additional available entry exists in the cache memory, transmits an additional acknowledgement to the cache memory, and transfers an additional information packet, before receiving an additional request from the cache memory.

20 Claims, 4 Drawing Sheets

(56) References Cited

U.S. PATENT DOCUMENTS

| | | |
|---|---|---|
| 2008/0307166 A1 | 12/2008 | Gunna |
| 2010/0064120 A1 | 3/2010 | Chang |
| 2012/0278685 A1 | 11/2012 | Gunna |
| 2016/0034400 A1* | 2/2016 | Dale ................... G06F 12/0862 711/122 |
| 2016/0103715 A1* | 4/2016 | Sethia ................. G06F 12/0844 718/106 |
| 2018/0173422 A1 | 6/2018 | Pierson |
| 2019/0042451 A1* | 2/2019 | Leone ................. G06F 12/0871 |
| 2019/0073309 A1* | 3/2019 | Gschwind ........... G06F 12/0811 |
| 2020/0089611 A1 | 3/2020 | Gandhi et al. |
| 2020/0249946 A1 | 8/2020 | Ward |
| 2021/0056024 A1* | 2/2021 | Levinsky ............ G06F 12/0811 |

OTHER PUBLICATIONS

Office Action for Taiwan Patent Application No. TW112117854, issued on Jun. 20, 2024, 10 pages.
Notice of Allowance for Taiwan Application No. 112117854 dated Aug. 27, 2024, 7 pages of English Translation and 6 pages of NOA.

* cited by examiner

PERFORMANCE AND RELIABILITY OF PROCESSOR STORE OPERATION DATA TRANSFERS

BACKGROUND

Field of the Invention

This invention relates generally to computer processor systems, and more particularly to systems and methods for improving the performance and reliability of store operation data transfers between a processor and a processor cache memory.

Background of the Invention

In computer processing systems, the processor serves as the central processing unit, and performs many important functions, such as arithmetic and logic operations, program instruction execution, data transfers, and other processing system control and logic functions. The processor includes a cache to assist in transferring data between the processor core and the processing system memory. The cache typically includes multiple levels, or tiers, having a smaller, faster level-one (L1) cache and a larger, relatively slower level-two (L2) cache. The processor includes a relatively small storage queue to temporarily store data, and each tier of the cache includes a queue to hold the data before storing it the larger cache storage.

Communication protocols exist between the processor cache (L2) store queue and the processor core store queue to control the data transfer between the processor core and the cache. The processor cache indicates that space is available in its storage by sending a request signal to the processor core for each available entry in the cache queue. The processor core responds with an acknowledgement signal to the cache and transfers a data packet from the processor queue to the cache. The cache accepts the data packet with an acknowledgement and stores the data packet in the cache store queue. The LSU waits until the cache sends an additional request before sending an additional data packet to the cache.

In view of the foregoing, what are needed are systems and methods that improve data transfer performance and reliability between the processor core and the processor cache. Processor systems attempt to improve the processor performance by anticipating empty entries in the processor cache store queues. In addition, multiple threads in the processor core share the processor cache and are competing for the entries in the cache store queue, and cause the communication protocols between the processor core store queue and the processor cache store queue to lose synchronization. The present invention prevents the processor cache from rejecting data transfers, and minimizes losing synchronization of the communication protocols between the processor core and processor cache store queues.

SUMMARY

The invention has been developed in response to the present state of the art and, in particular, in response to the problems and needs in the art that have not yet been fully solved by currently available systems and methods. The features and advantages of the invention will become more fully apparent from the following description and appended claims, or may be learned by practice of the invention as set forth hereinafter.

According to an embodiment of the invention described herein, a processor is provided for improving the performance of store operation data transfers in a computer processing system. In an embodiment, the computer processing system includes a processor, a memory, and a plurality of components for performing computer processing system functions. In an embodiment, the processor includes a load and store unit (LSU) and a cache memory for storing data information that is to be transferred to the memory and/or other components in the computer processing system. In an embodiment, the LSU includes a store queue having multiple entries for storing multiple information packets. In an embodiment, the cache memory includes a store queue having multiple entries for storing multiple information packets. In an embodiment the cache memory determines that the cache store queue contains an available entry. The cache memory transmits a request to the LSU to transfer an information packet to the cache memory. In an embodiment, the LSU transmits an acknowledgement in response to the cache request and transfers an information packet from an entry in the LSU store queue to the cache memory. In an embodiment, the cache memory receives the information packet from the LSU and stores the information packet in the available entry within the cache store queue.

In an embodiment, the LSU anticipates that an additional available entry exists in the cache memory, transmits an additional acknowledgement signal to the cache memory, and transfers an additional information packet from an additional entry in the LSU store queue to the cache memory. The cache memory determines that an additional available entry exists in the cache store queue, receives the information packet from the LSU, and stores the information packet in the additional available entry within the cache store queue. In an embodiment, the cache memory delays a subsequent request for a subsequent information packet, where the subsequent request also serves as an acknowledgement to the LSU that the cache successfully stored the additional information packet within the cache store queue. In an embodiment, the cache memory determines that an additional available entry does not exist in the cache store queue, and rejects the additional information packet transferred from the LSU. The LSU must wait for the cache memory to transmit a new request before retrying the transfer of the additional information from the LSU store queue to the cache memory.

In an embodiment, the cache memory calculates a time delay to send a subsequent request to the LSU for a subsequent information packet (subsequent request delay) based on the number of available entries within the cache store queue. In an embodiment, the cache memory calculates the subsequent request delay based on the recent average time to the transfer an information packet from the LSU store queue to the cache store queue. In an embodiment, the cache memory sets and resets the subsequent request delay based on a threshold value, where the threshold value is based on the number of available entries in the cache store queue. The cache memory sets the subsequent request delay to a determined time interval when the number of available entries in the cache store queue is less than the threshold value. The cache memory resets the subsequent request delay to no time delay when the number of available entries in the cache store queue is greater than or equal to the threshold value.

According to another embodiment of the invention described herein, a method is provided for improving the performance of store operation data transfers in a computer processing system, where the computer processing system includes a processor and a cache memory, the processor includes a load and store unit (LSU) having a store queue, and the cache includes a store queue. In an embodiment, the method includes storing information packets in entries in the LSU store queue. In an embodiment, the method includes the cache memory determining that an available entry exists within the cache store queue and requests an information packet from the LSU. In an embodiment, the method includes the LSU acknowledging the request from the cache memory and transferring an information packet from an entry in the LSU store queue to the cache memory. In an embodiment, the method includes the cache memory receiving the information packet from the LSU and storing the information packet in the available entry within the cache store queue.

In an embodiment, the method includes the LSU anticipating that the cache memory has an additional available entry in the cache store queue. In an embodiment, the method includes the LSU transmitting an additional acknowledgement to the cache memory and transferring an additional information packet to the cache memory before the cache memory requests the additional information packet. In an embodiment, the method includes the cache memory determining that an additional available entry exists within the cache store queue, receiving the additional information packet from the LSU, and storing the additional information packet in the additional available entry within the cache store queue. In an embodiment, the method includes the cache memory delaying a subsequent request to the LSU for a subsequent information packet, where the subsequent request serves as an acknowledgement that the additional information packet was stored within the cache memory. In an embodiment, the method alternatively includes the cache memory determining that an additional available entry does not exist in the cache store queue, and rejecting the transfer of the additional information packet from the LSU, thereby requiring the LSU to retry the transfer of the additional information packet when it receives another request from the cache memory.

In an embodiment, the method includes the cache memory calculating a time delay to send a subsequent request to the LSU for a subsequent information packet (subsequent request delay) based on the number of available entries within the cache store queue. In an embodiment, the method includes the cache memory calculating the subsequent request delay based on the recent average time to the transfer an information packet from the LSU store queue to the cache store queue. In an embodiment, the method includes the cache memory setting and resetting the subsequent request delay based on a threshold value, where the threshold value is based on the number of available entries in the cache store queue. The method includes the cache memory setting the subsequent request delay to a determined time interval when the number of available entries in the cache store queue is less than the threshold value. The method includes the cache memory resetting the subsequent request delay to no time delay when the number of available entries in the cache store queue is greater than or equal to the threshold value.

According to another embodiment of the invention described herein, a computer program product is provided for improving the performance of store operation data transfers in a computer processing system, where the computer processing system includes a processor and a cache memory, the processor includes a load and store unit (LSU) having a store queue, and the cache includes a store queue. In an embodiment, the computer program product includes a non-transitory computer-readable storage medium having computer-usable program code embodied therein. In an embodiment, the computer-usable program code is configured to perform operations when executed by the processor. In an embodiment, the computer program product operations include storing information packets in entries in the LSU store queue. In an embodiment, the computer program product operations include the cache memory determining that an available entry exists within the cache store queue and requests an information packet from the LSU. In an embodiment, the computer program product operations include the LSU acknowledging the request from the cache memory and transferring an information packet from an entry in the LSU store queue to the cache memory. In an embodiment, the computer program product operations include the cache memory receiving the information packet from the LSU and storing the information packet in the available entry within the cache store queue.

In an embodiment, the computer program product operations include the LSU anticipating that the cache memory has an additional available entry in the cache store queue. In an embodiment, the computer program product operations include the LSU transmitting an additional acknowledgement to the cache memory and transferring an additional information packet to the cache memory before the cache memory requests the additional information packet. In an embodiment, the computer program product operations include the cache memory determining that an additional available entry exists within the cache store queue, receiving the additional information packet from the LSU, and storing the additional information packet in the additional available entry within the cache store queue. In an embodiment, the computer program product operations include the cache memory delaying a subsequent request to the LSU for a subsequent information packet, where the subsequent request serves as an acknowledgement that the additional information packet was stored within the cache memory. In an embodiment, the computer program product operations alternatively include the cache memory determining that an additional available entry does not exist in the cache store queue, and rejecting the transfer of the additional information packet from the LSU, thereby requiring the LSU to retry the transfer of the additional information packet when it receives another request from the cache memory.

In an embodiment, the computer program product operations include the cache memory calculating a time delay to send a subsequent request to the LSU for a subsequent information packet (subsequent request delay) based on the number of available entries within the cache store queue. In an embodiment, the computer program product operations include the cache memory calculating the subsequent request delay based on the recent average time to the transfer an information packet from the LSU store queue to the cache store queue. In an embodiment, the computer program product operations include the cache memory setting and resetting the subsequent request delay based on a threshold value, where the threshold value is based on the number of available entries in the cache store queue. The computer program product operations include the cache memory setting the subsequent request delay to a determined time interval when the number of available entries in the cache store queue is less than the threshold value. The computer program product operations include the cache memory resetting the subsequent request delay to no time delay when the number of available entries in the cache store queue is greater than or equal to the threshold value.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Exemplary embodiments of improving the performance and reliability of store operation data transfers within a computer processing system are described herein. A computer processing system includes one or more processors, a memory, and a plurality of components to perform computer processing functions and controls. The processor includes a load and store unit (LSU) and a cache memory. The LSU and cache memory include store queues having entries for storing information packets. The LSU transfers information packets to the cache memory, where the information packets are stored until the information needs to be transferred from the cache memory to the main memory and/or other components within the computer processing system. The cache memory requests an information packet from the LSU when the cache determines that an available entry exists in the cache store queue. The LSU acknowledges the request and transfers the information packet from the LSU store queue to the cache memory. The LSU accelerates the data transfers by anticipating that the cache memory has an available entry in the cache store queue, transmits an additional acknowledgement and an additional information packet to the cache memory. The cache memory accepts the additional information packet if it has an available entry in the cache store queue. Alternatively, the cache memory rejects the transfer of the additional information packet if it does not have an additional entry in the cache store queue. The LSU must then retry the transfer of the additional information packet. The cache memory delays transmitting a subsequent request to the LSU for a subsequent information packet to avoid requiring the cache to reject an additional information packet transferred from the LSU and requiring the LSU to retry the additional information packet transfer.

Figure 1:
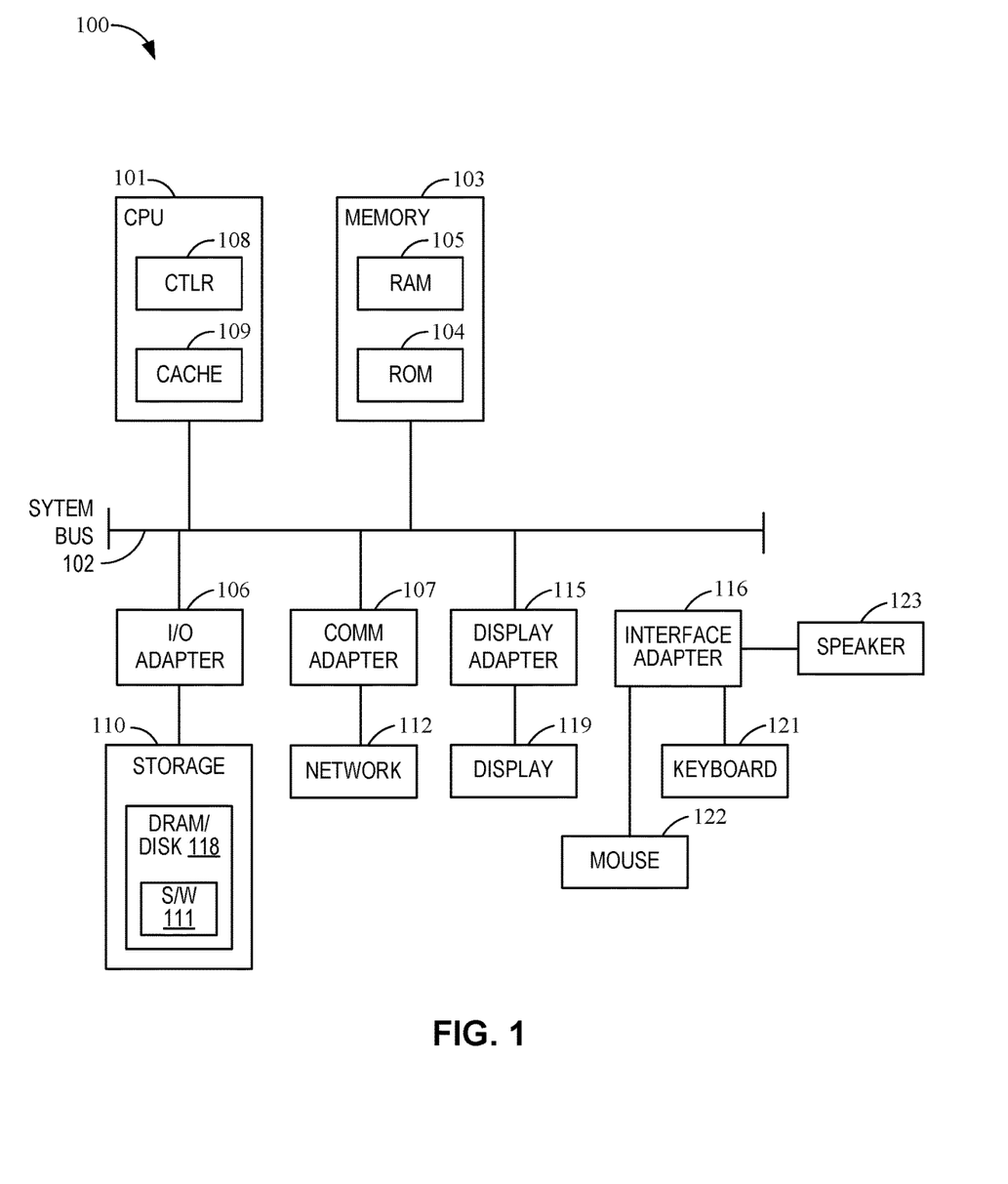
FIG. 1 is a high-level block diagram representing an example of a computer processing system, in which systems and methods in accordance with embodiments of the invention may be implemented.

Referring to FIG. 1, a computer processing system 100 is generally shown in accordance with an embodiment. The computer processing system 100 can be an electronic, computer framework comprising and/or employing any number and combination of computing devices and networks utilizing various communication technologies, as described herein. In certain embodiments, the computer processing system 100 can be easily scalable, extensible, and modular, with the ability to change to different services or reconfigure some features independently of others. In certain embodiments, the computer processing system 100 may be, for example, a server, desktop computer, laptop computer, tablet computer, or smartphone. In addition, the computer processing system 100 may be a cloud computing node. In certain embodiments, the computer processing system 100 may be described in the general context of computer system executable instructions, such as program modules, being executed by a computer system. In general, program modules may include routines, programs, objects, components, logic, data structures, and so on that perform particular tasks or implement particular abstract data types. In certain embodiments, the computer processing system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer processing system 100 has one or more central processing units (CPU(s)) 101 (collectively or generically referred to as processor(s) 101). In certain embodiments, the processors 101 can be a single-core processor, multi-core processor, computing cluster, or any number of other configurations. The processors 101, also referred to as processing circuits, may also include one or more accelerators (e.g., a graphics processing unit, or GPU). In an embodiment, the processor includes a cache 109 and a controller 108 to assist in perform processor-related functions, such as arithmetic and logic operations, program instruction execution, data transfers, and other processing system control and logic functions. In certain embodiments, the processors 101 are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. In certain embodiments, the system memory 103 provides temporary memory space for operations of said instructions during operation. The system memory 103 can include random access memory (RAM), read only memory, flash memory, or any other suitable memory systems.

In certain embodiments, the computer processing system 100 comprises an input/output (I/O) adapter 106 and a communications adapter 107 coupled to the system bus 102. The I/O adapter 106 may be a small computer system interface (SCSI) adapter that communicates with a hard disk 118 and/or any other similar component. The I/O adapter 106 and the flash memory (DRAM) 118 and/or hard disk drive 118 are collectively referred to herein as a mass storage 110. In certain embodiments, software 111 for execution on the computer processing system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail.

In certain embodiments, the communications adapter 107 interconnects the system bus 102 with a network 112, which may be an outside network, enabling the computer processing system 100 to communicate with other systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

In certain embodiments, additional input/output devices are connected to the system bus 102 via a display adapter 115 and an interface adapter 116. In an embodiment, the adapters 106, 107, 115, and 116 may be connected to one or more I/O buses that are connected to the system bus 102 via an intermediate bus bridge (not shown). In an embodiment, a display 119 (e.g., a display screen or monitor) is connected to the system bus 102 through a display adapter 115, which may include a graphics controller to improve the performance of graphics intensive applications and a video controller. In an embodiment, a keyboard 121, a mouse 122, a speaker 123, and/or other devices can be interconnected to the system bus 102 via the interface adapter 116, which may include, for example, a Super I/O chip integrating multiple device adapters into a single integrated circuit. In certain embodiments, suitable I/O buses for connecting peripheral devices such as hard disk controllers, network adapters, and graphics adapters typically include common protocols, such as the Peripheral Component Interconnect (PCI). Thus, as configured in FIG. 1, the computer processing system 100 includes processing capability in the form of the processors 101, and, storage capability including the system memory 103 and the mass storage 110, input means such as the keyboard 121 and the mouse 122, and output capability including the speaker 123 and the display 119.

In certain embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some embodiments, an external computing device may be an external webserver or a cloud computing node.

It is to be understood that the block diagram of FIG. 1 is not intended to indicate that the computer processing system 100 is to include all of the components shown in FIG. 1. Rather, the computer processing system 100 can include any appropriate fewer or additional components not illustrated in FIG. 1 (e.g., additional memory components, embedded controllers, modules, additional network interfaces, etc.). Further, the embodiments described herein with respect to computer processing system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
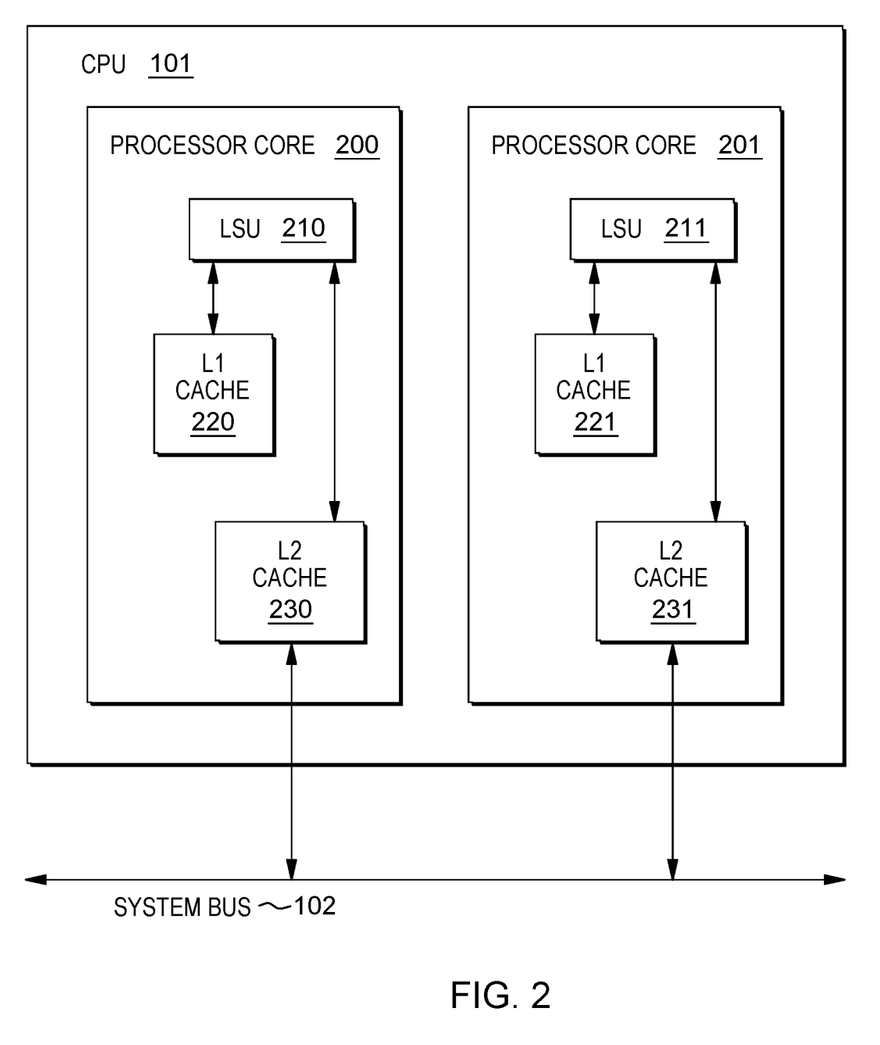
FIG. 2 is a high-level block diagram representing a processor, or central processing unit within a computer processing system, in accordance with an embodiment of the invention.

FIG. 2 represents a block diagram of a processor, or central processing unit, 101, in accordance with an embodiment of the present invention. In an embodiment, the processor includes one or more processor cores 200, 201. In an embodiment, the processor cores 200, 201 comprise load-store units (LSU) 210, 211, and multiple levels of cache memories 109. In an embodiment, the cache memory 109 for each processor core consists of a level-one (L1) cache 220, 221 and a level-two (L2) cache 230, 231. Level-one (L1) caches 220, 221 typically comprise memories with the fastest access times, and are smaller in size. Level-two (L2) caches 230, 231 typically comprise memories fast access times that are slower than L1 caches 220, 221, and are much larger in size. As stated previously, the processor cores 200, 201 perform processor-related functions, such as arithmetic and logic operations, program instruction execution, data transfers, and other processing system control and logic functions. To perform these functions, the processor cores 200, 201 need to access information, instructions and/or data, from the processor memory 103 through the system bus 102. In an embodiment, the processor cores 200, 201 utilize load-store units 210, 211 and multi-level cache memories 220, 221, 230, 231 to transfer information more efficiently and quickly. Information, including instructions and data, can be prefetched from the system memory 103 and stored in the L1 cache 220 or the L2 cache 230 based on algorithms within the processor core 200 that predict which information is likely to be accessed from the system memory 103.

It is to be understood that the block diagram of FIG. 2 is not intended to show all of the components included in processor cores 200, 201. FIG. 2 includes two processor cores 200, 201, but this is intended to show only an exemplary embodiment. The central processing unit 101 can include a single processor core 200, or multiple (more than two) processor cores 200, 201. As stated previously, the processor cores 200, 201 perform many processing-related functions and can include additional components and control logic to assist in performing such functions, which are not shown in FIG. 2. In addition, particular embodiments of a processor cores 200, 201 include more than two levels of cache memory 108. In an embodiment, processor cores 200, 201 include level-three (L3) cache and level-four (L4) caches to further the performance and efficiency of accessing information from the system memory 103. Further, the embodiments described herein with respect to processor cores 200, 201 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
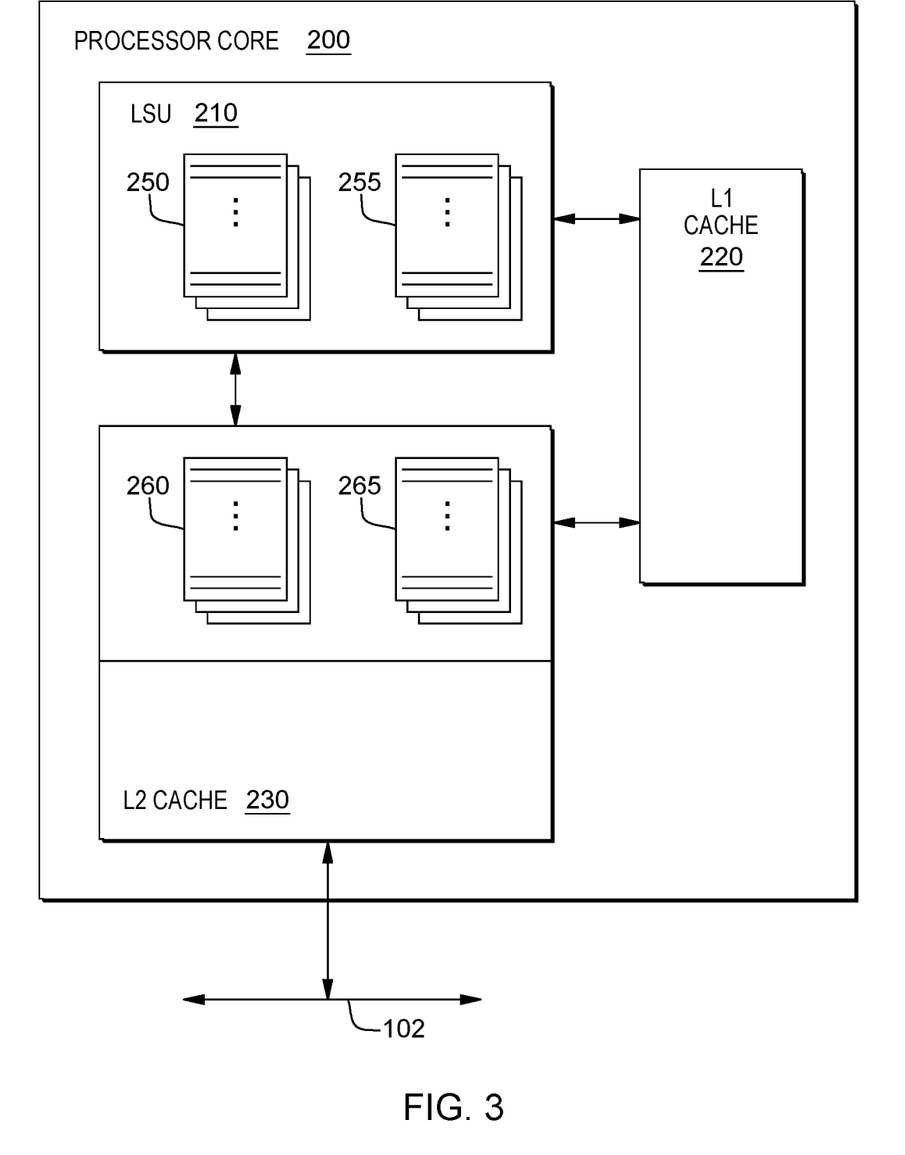
FIG. 3 is a high-level block diagram representing a processor, and cache memory components within the processor, in accordance with an embodiment of the invention.

FIG. 3 represents a block diagram of a processor core in accordance with an embodiment of the present invention. In an embodiment, the processor core 200 includes a load-store unit (LSU) 210, a L1 cache memory 220, and a L2 cache memory 230. In an embodiment, the LSU 210 includes store queues 250 and load queues 255, which send and receive information to and from the L1 220 and L2 230 cache memories. The information consists of data to be transferred, instructions to be executed, addresses to be accessed, or other information necessary for the processor 200 to perform its operations. In an embodiment, the L2 cache 230 includes corresponding store queues 260 and load queues 265. In an embodiment, the LSU 210 is coupled to the L1 cache 220 and L2 cache 230 to transfer and receive information. Likewise, the L2 cache 260 is coupled to the LSU 210 and L1 cache 220 to transfer and receive information. In an embodiment, the L2 cache 230 is coupled to the system bus 102 to transfer and receive information from components within the processor system 100. In an embodiment, the LSU 210, L1 cache 220, and L2 cache 230 include logic to communicate and control the information transfers between the components.

It is to be understood that the block diagram of FIG. 3 is not intended to show all of the components included in processor core 200, but is intended to show only an exemplary embodiment of the components in the processor core 200 that facilitate the transfer of information within the processor core 200 and within the processor system 100. FIG. 3 includes a single processor core 200 having a single LSU 210, a single L1 cache 220, and a single L2 cache 230. In alternate embodiments, the L1 cache 220 and L2 cache 230 could be partitioned into multiple cache segments. In such instances, separate LSUs 210 could be implemented to communicate and control information transfers with the partitioned L1 cache 220 and L2 cache 230 segments. In addition, embodiments described within FIG. 3 include control signals for communicating and transferring data between the LSU 210, L1 cache 220, and L2 cache 230. Such control signals may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
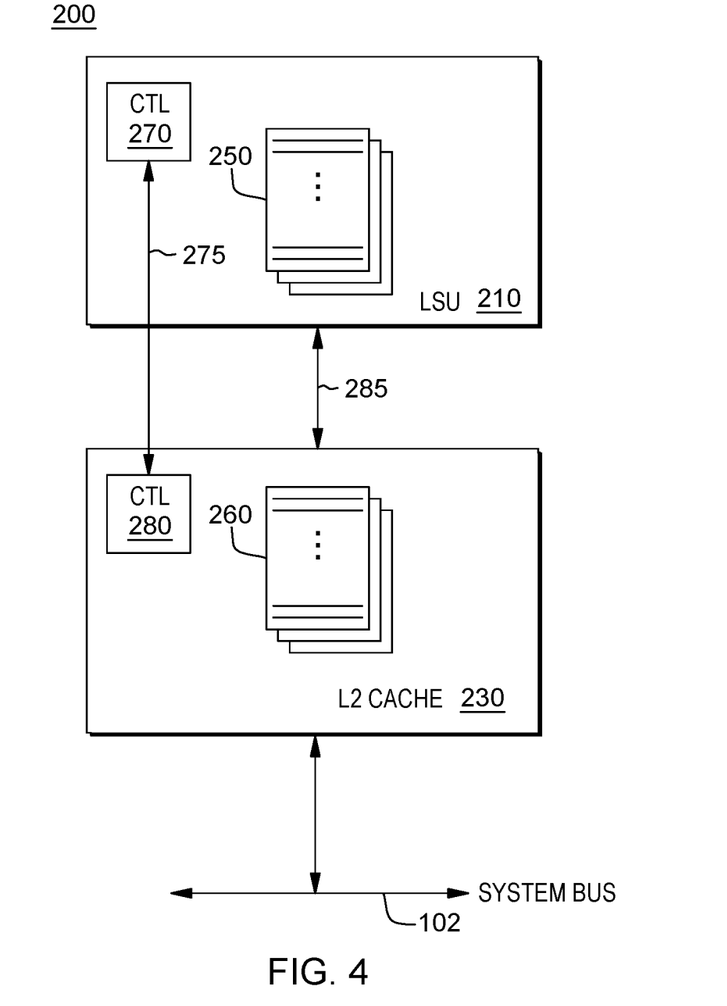
FIG. 4 is a high-level block diagram representing an improved system and computer-implemented method for transferring information within the computer processing system using the cache memories within the processor core, in accordance with an embodiment of the invention.

FIG. 4 represents a block diagram of an improved system and computer-implemented method for transferring data information within the computer processing system 100 using the LSU 210 and L2 cache memory 230 within the processor core 200. In an embodiment, the processor core includes an LSU 210 coupled to an L2 cache 230. In an embodiment, the LSU includes store queues 250 to store data information and a control module 270 to transmit control and communication signals. In an embodiment, the L2 cache 230 includes store queues to store data information and a control module 280 to transmit control and communication signals. In an embodiment, the LSU control module 270 is coupled to the L2 cache control module 280 through a control bus 275 and a data bus 285. In an embodiment, the LSU control module 270 and the L2 cache control module include logic, wherein the logic may include hardware, software, firmware, or a combination of hardware, software, and firmware.

In an embodiment, the L2 cache control module 280 transmits a POP signal along the control bus 275 to the LSU control module 270 when an entry is available in the L2 store queue 260. In an embodiment, the LSU control module 270 transmits a PUSH signal along the control bus 275 when data information is ready to be transferred from the LSU store queue 250 to the L2 cache store queue 260. The LSU 210 then initiates the transfer of data information from the LSU store queue 250 to the L2 cache store queue 260 through the data bus 285 until the data transfer is complete. In an embodiment, the L2 cache control module 280 transmits a successive POP signal along the control bus 275 to indicate that an additional entry is available within the L2 cache store queue 260. The process then repeats as the LSU control module 275 transmits a PUSH signal along the control bus 275 to indicate that additional data information is ready to be transferred from the LSU store queue 250 to the L2 cache store queue 260, and initiates the transfer of data information from the LSU store queue 250 to the L2 cache store queue 260 through the data bus 285.

In a further embodiment, the LSU 210 accelerates the data information transfer to the L2 cache 230 by anticipating that the L2 cache store queue has additional available entries. In an embodiment, the LSU control module 270 responds to the POP signal from the L2 cache control module 280 by transmitting a PUSH signal along the control bus 275, and initiating the transfer of data information from the LSU store queue 250 to the L2 cache store queue 260. In an embodiment, the LSU control module 270 transmits an additional PUSH signal along the control bus 275 to the L2 cache control module 280 when the previous data information transfer is complete and before receiving an additional POP signal from the L2 cache control module 280. As before, the LSU control module 270 initiates the subsequent data information transfer from the LSU store queue to the L2 cache store queue 260 along the data bus 285. Thus, the LSU 210 anticipates that the L2 cache 230 contains an additional available entry in the L2 cache store queue 260, and increases the transfer speed and performance between the LSU store queue 250 and the L2 cache store queue 260. In an embodiment, the L2 cache control module 280 transmits a POP signal to the LSU control module 270 along the control bus 275 indicating that the L2 cache control store 260 contains an available entry, and receives the data information transfer from the LSU store queue 250. In an embodiment, the L2 cache control module 280 transmits a BOUNCE signal to the LSU control module 270 along the control bus 275 indicating that the L2 cache control store 260 does not contain an available entry, and rejects the data information transfer from the LSU store queue 250. In this instance, the LSU 210 must wait for an available entry in the L2 cache 230 to retry the data information transfer, and as such, the LSU control module 270 must wait to receive a subsequent POP signal from the L2 cache control module 280 along the control bus 275. Thus, the LSU anticipates incorrectly that an available entry exists in the L2 cache store queue 260, and degrades the store queue transfer performance between the LSU 210 and the L2 cache 230 in the processor core 200. In addition, the risk of losing data information increases should the LSU 210 release the data information transferred in the subsequent PUSH signal from the LSU store queue 250 before the LSU control module 270 receives the BOUNCE signal from the L2 cache control module 280.

In a further embodiment, the L2 cache 230 can delay indicating to the LSU 210 that entries are available in the L2 cache store queue 260. As stated previously, the L2 cache control module 280 transmits a POP signal when an entry becomes available within the L2 cache store queue 260. In an embodiment, the L2 delays transmitting the POP signal when an entry becomes available in the L2 cache store queue 260. In an embodiment, the delay can be a time delay for an interval of fixed duration. In an embodiment, the delay can be a time delay that can vary in length based on certain factors and/or metrics measured within the processor core 200. In an embodiment, the delay can be calculated based on the time interval for transferring data information from the LSU store queue 250 to the L2 cache store queue 260. In an embodiment, the delay can be a time interval adjusted based on the number of available entries in the L2 cache store queue 260. In an embodiment, the delay can be calculated using an algorithm based on a combination of factors and metrics within the processor core, including but not limited to the number of available entries in the L2 store queue 260, the free space in the L2 cache 230 or L1 cache 220, the average time to transfer data information between the LSU 230 and the L2 cache 250, and the frequency of store operations within the processor core. By delaying the transmission of the POP signal from the L2 cache control module 280 to the LSU control module 270, the L2 cache control module 280 ensures that the L2 cache store queue 260 can successfully complete an additional data information transfer should the LSU 210 attempt to accelerate data information transfer to the L2 cache 230 by anticipating that the L2 store queue 260 contains an additional available entry.

In a further embodiment, the delay can be a fixed time interval that is turned on and off, or set and reset, based on a threshold, or a variable time interval calculated periodically based on factors and metrics measured within the processor core 200. In an exemplary embodiment, the delay is set or reset based on the number of available entries in the L2 store queue 260. The L2 cache control module 280 turns on, or sets, the delay if the number of available entries in the L2 cache store queue is less than a threshold and turns off, or resets, the delay if the number of available entries in the L2 cache store queue exceeds the threshold. As an example, the L2 cache 230 delays sending a POP signal to the LSU 210 if the number of available entries in the L2 store queue 260 is less than four entries, and does not delay sending the POP signal to initiate an data information transfer from the LSU 210 if the number of available entries in the L2 cache store queue 260 is greater than or equal to four entries. In another exemplary embodiment, the time delay is calculated to be longer or shorter based on certain performance metrics in the processor core, including but not limited to the number of available entries in the L2 cache store queue 260, the recent averages in the transfer time or transfer rate to transfer data information from the LSU store queue 250 to the L2 cache store queue 260, and/or the recent frequency of memory operations, or store operations, occurring within the processor core 200. The capability to strategically set or reset, or variably adjust the time interval of the delay enhances the performance of the data information transfers between the LSU store queue 250 and the L2 cache store queue 260 by maximizing the opportunities for the L2 cache 230 to accept accelerated data information transfers from the LSU 210. The L2 cache control module 280 delays transmitting a POP signal to the LSU control module 270 when the L2 store queue 260 is near capacity and has few available entries, or when other factors indicate that the processor core 200 environment is stressed. Alternatively, the L2 cache control module 280 does not delay transmitting a POP signal to the LSU control module 270 when the L2 store queue 260 has several available entries, or when other factors indicate that the processor core 200 environment is not stressed. By strategically implementing a time delay for the L2 cache 230 to initiate a data information transfer from the LSU store queue 250 to the L2 cache store queue, the L2 cache 230 can successfully handle additional requests from the LSU 210 to receive additional data information transfers and avoid having to reject such requests because the L2 cache store queue 260 has no available entries.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed:

1. A processor included within a central processing unit (CPU), the CPU included within a computer processor system, the CPU coupled to a memory, the processor comprising:
    a load and store unit (LSU) including an LSU control module and an LSU store queue, the LSU store queue including a first plurality of entries for storing a first plurality of information packets;
    a cache memory (L2 cache) coupled to the LSU, the L2 cache including an L2 cache control module and an L2 cache store queue, the L2 cache store queue including a second plurality of entries for storing a second plurality of information packets;
    wherein the L2 cache determines that a free entry of the second plurality of entries exists in the L2 cache store queue, and transmits a request to the LSU to transfer an information packet of the first plurality of information packets based on the determination that the free entry exists in the L2 cache;
    wherein the LSU transmits, based on the request, an acknowledgement to the L2 cache and transfers the information packet from an entry of the first plurality of entries in the LSU store queue over a data bus coupled to the L2 cache;
    wherein the acknowledgement is different from the information packet;
    wherein the L2 cache receives the information packet from the LSU store queue and stores the information packet in the free entry in the L2 cache store queue; and
    wherein, before the L2 cache requests an additional information packet from the first plurality of information packets, the LSU anticipates that the L2 cache store queue has an additional free entry in the second plurality of entries, transmits an additional acknowledgement to the L2 cache, and transfers the additional information packet from an additional entry in the first plurality of entries in the LSU store queue.

2. The processor of claim 1, wherein the L2 cache determines that the additional free entry exists in the L2 cache store queue, receives the additional information packet from the LSU store queue, and stores the additional information packet in the additional free entry within the L2 cache store queue; and
    wherein the L2 cache delays transmitting a subsequent request to the LSU for a subsequent information packet of the first plurality of information packets to be transferred from the LSU, the subsequent request also serving as an acknowledgement to the LSU for storing the additional information packet in the L2 cache.

3. The processor of claim 1, wherein the L2 cache requests the information packet by transmitting a POP signal from the L2 cache control module along a control bus coupled to the LSU control module, and wherein the LSU acknowledges the request from the L2 cache by transmitting a PUSH signal from the LSU control module along the control bus coupled to the L2 cache control module.

4. The processor of claim 2, wherein the L2 cache control module determines the delay to transmit the subsequent request for the subsequent information packet, and calculates the delay based on a number of free entries in the second plurality of entries within the L2 cache store queue.

5. The processor of claim 4, wherein the L2 cache control module further calculates the delay based on an average time to transfer the information packet from the LSU store queue to the L2 cache store queue.

6. The processor of claim 4, wherein the L2 cache control module sets and resets the delay based on a threshold, wherein the threshold is the number of free entries in the L2 cache store queue;
  wherein the L2 cache control module sets the delay to a fixed time interval when the number of free entries in the L2 cache store queue is less than the threshold; and
  wherein the L2 cache control module resets the delay to no time delay when the number of free entries in the L2 cache store queue is greater than or equal to the threshold.

7. The processor of claim 1, wherein the L2 cache determines that the additional free entry does not exist in the L2 cache store queue;
  wherein the L2 cache control module transmits a BOUNCE signal along a control bus to the LSU control module to indicate that the additional information packet was rejected and not stored in the L2 cache store queue; and
  wherein the LSU must wait for a subsequent request from the L2 cache before retrying the transfer of the additional information packet.

8. A method for improving performance of store operation data information transfers within a computer processing system, the computer processing system including a processor and a memory, the processor including a cache memory and a load and store unit, the method comprising:
  storing an information packet within the load and store unit (LSU), the information packet to be transferred to the cache memory (L2 cache), the LSU including an LSU store queue having a first plurality of entries to store a first plurality of information packets, the first plurality of information packets includes the information packet, the L2 cache including an L2 cache store queue having a second plurality of entries to store a second plurality of information packets;
  determining, by the L2 cache, that a free entry of the second plurality of entries exists in the L2 cache store queue;
  transmitting, based on the determination, a request from the L2 cache to the LSU to transfer the information packet to the L2 cache;
  transmitting, based on the request, an acknowledgement from the LSU to the L2 cache, and transferring the information packet from an entry of the first plurality of entries in the LSU store queue to the L2 cache, wherein the acknowledgement is different from the information packet;
  receiving the information packet in the L2 cache and storing the information packet in the free entry in the L2 cache store queue; and
  before the L2 cache requests an additional information packet from the first plurality of information packets, transmitting an additional acknowledgement from the LSU to the L2 cache, in anticipation that the L2 cache has an additional free entry in the second plurality of entries in the L2 cache store queue, and transferring the additional information packet from an additional entry in the first plurality of entries in the LSU store queue to the L2 cache.

9. The method of claim 8, further comprising:
  determining, by the L2 cache, that the additional free entry exists in the L2 cache store queue;
  storing the additional information packet from the LSU store queue in the additional free entry within the L2 cache store queue; and
  delaying transmission of a subsequent request to the LSU for a subsequent information packet of the first plurality of information packets to be transferred from the LSU, the subsequent request also serving as an acknowledgement to the LSU for storing the additional information packet in the L2 cache.

10. The method of claim 9, wherein the L2 cache includes an L2 cache control module, and the transmitting of the request by the L2 cache further includes the L2 cache control module transmitting a POP signal along a control bus coupled to the LSU; and
  wherein the LSU includes an LSU control module, and the transmitting of the acknowledgement by the LSU further includes the LSU control module transmitting a PUSH signal along the control bus coupled to the L2 cache.

11. The method of claim 10, wherein the delaying of the transmission of the subsequent request is determined by the L2 cache control module, and the L2 cache control module calculating the delaying of the transmission of the subsequent request based on a number of free entries in the second plurality of entries within the L2 cache store queue.

12. The method of claim 11, wherein the L2 cache control module further calculates the delaying of the transmission of the subsequent request based on an average time to transfer the information packet from the LSU store queue to the L2 cache store queue.

13. The method of claim 11, wherein the L2 cache control module sets and resets the delaying of the transmission of the subsequent request based on a threshold, wherein the threshold is the number of free entries in the L2 cache store queue;
  wherein the L2 cache control module sets the delaying of the transmission of the subsequent request to a fixed time interval when the number of free entries in the L2 cache store queue is less than the threshold; and
  wherein the L2 cache control module resets the delaying of the transmission of the subsequent request to no time delay when the number of free entries in the L2 cache store queue is greater than or equal to the threshold.

14. The method of claim 10, further comprising: rejecting the additional information packet when the L2 cache determines that the additional free entry does not exist in the L2 cache store queue, wherein the L2 cache control module transmits a BOUNCE signal along the control bus to the LSU control module to indicate that the additional information packet was rejected and not stored in the L2 cache store queue; and retrying the transferring of the additional information packet by the LSU when the L2 cache transmits the subsequent request to the LSU.

15. A computer program product for improving performance of store operation data information transfers within a computer processing system, the computer program product comprising one or more computer-readable storage medium, and program instructions collectively stored on the one or more computer-readable storage medium, the programming instructions when executed by the computer processing system, causes the computer processing system to execute operations, the operations comprising: storing an information packet within a load and store unit (LSU) of a processor of the computer processing system, the information packet to be transferred to a cache memory (L2 cache) of the processor, the LSU including an LSU store queue having a first plurality of entries to store a first plurality of information packets, the first plurality of information packets includes the information packet, the L2 cache including an L2 cache store queue having a second plurality of entries to store a second plurality of information packets; determining, by the L2 cache, that a free entry of the second plurality of entries exists in the L2 cache store queue; transmitting, based on the determination, a request from the L2 cache to the LSU to transfer the information packet to the L2 cache; transmitting, based on the request, an acknowledgement from the LSU to the L2 cache, and transferring the information packet from an entry of the first plurality of entries in the LSU store queue to the L2 cache, wherein the acknowledgement is different from the information packet; receiving the information packet in the L2 cache and storing the information packet in the free entry in the L2 cache store queue; and before the L2 cache requests an additional information packet from the first plurality of information packets, transmitting an additional acknowledgement from the LSU to the L2 cache, in anticipation that the L2 cache has an additional free entry in the second plurality of entries in the L2 cache store queue, and transferring the additional information packet from an additional entry in the first plurality of entries in the LSU store queue to the L2 cache.

16. The computer program product of claim 15, further comprising:
determining, by the L2 cache, that the additional free entry exists in the L2 cache store queue;
storing the additional information packet from the LSU store queue in the additional free entry within the L2 cache store queue; and
delaying transmission of a subsequent request from the L2 cache for a subsequent information packet of the first plurality of information packets to be transferred from the LSU, the subsequent request also serving as an acknowledgement to the LSU for storing the additional information packet in the L2 cache.

17. The computer program product of claim 16, wherein the L2 cache includes an L2 cache control module, and the transmitting of the request by the L2 cache further includes the L2 cache control module transmitting a POP signal along a control bus coupled to the LSU; and
wherein the LSU includes an LSU control module, and the transmitting of the acknowledgement by the LSU further includes the LSU control module transmitting a PUSH signal along the control bus coupled to the L2 cache.

18. The computer program product of claim 17, wherein the delaying of the transmission of the subsequent request is determined by the L2 cache control module, the L2 cache control module calculating the delaying of the transmission of the subsequent request based on a number of free entries in the second plurality of entries within the L2 cache store queue.

19. The computer program product of claim 18, wherein the L2 cache control module sets and resets the delaying of the transmission of the request based on a threshold, wherein the threshold is the number of free entries in the L2 cache store queue;
wherein the L2 cache control module sets the delaying of the transmission of the subsequent request to a fixed time interval when the number of free entries in the L2 cache store queue is less than the threshold; and
wherein the L2 cache control module resets the delaying of the transmission of the subsequent request to no time delay when the number of free entries in the L2 cache store queue is greater than or equal to the threshold.

20. The computer program product of claim 17, further comprising:
rejecting the additional information packet when the L2 cache determines that the additional free entry does not exist in the L2 cache store queue, wherein the L2 cache control module transmits a BOUNCE signal along the control bus to the LSU control module to indicate that the additional information packet was rejected and not stored in the L2 cache store queue; and
retrying the transferring of the additional information packet by the LSU when the L2 cache transmits the subsequent request to the LSU.

* * * * *